United States Patent
Bengio et al.

(10) Patent No.: US 10,573,293 B2
(45) Date of Patent: Feb. 25, 2020

(54) END-TO-END TEXT-TO-SPEECH CONVERSION

(71) Applicant: Google LLC, Mountain View, CA (US)

(72) Inventors: Samuel Bengio, Los Altos, CA (US); Yuxuan Wang, Mountain View, CA (US); Zongheng Yang, Berkeley, CA (US); Zhifeng Chen, Sunnyvale, CA (US); Yonghui Wu, Fremont, CA (US); Ioannis Agiomyrgiannakis, London (GB); Ron J. Weiss, New York, NY (US); Navdeep Jaitly, Mountain View, CA (US); Ryan M. Rifkin, Oakland, CA (US); Robert Andrew James Clark, Hertfordshire (GB); Quoc V. Le, Sunnyvale, CA (US); Russell J. Ryan, Mountain View, CA (US); Ying Xiao, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/447,862

(22) Filed: Jun. 20, 2019

(65) Prior Publication Data

US 2019/0311708 A1    Oct. 10, 2019

Related U.S. Application Data

(63) Continuation of application No. PCT/US2018/025101, filed on Mar. 29, 2018.

(30) Foreign Application Priority Data

Mar. 29, 2017 (GR) .............................. 20170100126

(51) Int. Cl.
*G10L 13/027* (2013.01)
*G10L 15/16* (2006.01)
(Continued)

(52) U.S. Cl.
CPC ............ *G10L 13/08* (2013.01); *G06N 3/0454* (2013.01); *G06N 3/08* (2013.01); *G06N 3/084* (2013.01);
(Continued)

(58) Field of Classification Search
None
See application file for complete search history.

(56) References Cited

U.S. PATENT DOCUMENTS

| | | | | |
|---|---|---|---|---|
| 10,332,508 B1 * | 6/2019 | Hoffmeister | ............ | G10L 15/16 |
| 2013/0311412 A1 * | 11/2013 | Lazar | ..................... | H03M 1/82 |
| | | | | 706/16 |

(Continued)

FOREIGN PATENT DOCUMENTS

EP          2953065          12/2015

OTHER PUBLICATIONS

Yao et al., "Sequence-to-sequence neural net models for grapheme-to-phoneme conversion." arXiv preprint arXiv:1506.00196 (Year: 2015).*

(Continued)

*Primary Examiner* — Seong-Ah A Shin
(74) *Attorney, Agent, or Firm* — Fish & Richardson P.C.

(57) ABSTRACT

Methods, systems, and apparatus, including computer programs encoded on computer storage media, for generating speech from text. One of the systems includes one or more computers and one or more storage devices storing instructions that when executed by one or more computers cause the one or more computers to implement: a sequence-to-sequence recurrent neural network configured to: receive a sequence of characters in a particular natural language, and process the sequence of characters to generate a spectrogram of a verbal utterance of the sequence of characters in the particular natural language; and a subsystem configured to:
(Continued)

receive the sequence of characters in the particular natural language, and provide the sequence of characters as input to the sequence-to-sequence recurrent neural network to obtain as output the spectrogram of the verbal utterance of the sequence of characters in the particular natural language.

20 Claims, 4 Drawing Sheets

(51) Int. Cl.

| | | |
|---|---|---|
| *G10L 13/08* | (2013.01) | |
| *G06N 3/08* | (2006.01) | |
| *G10L 25/18* | (2013.01) | |
| *G10L 25/30* | (2013.01) | |
| *G10L 13/04* | (2013.01) | |
| *G06N 3/04* | (2006.01) | |

(52) U.S. Cl.
CPC ............. *G10L 13/04* (2013.01); *G10L 15/16* (2013.01); *G10L 25/18* (2013.01); *G10L 25/30* (2013.01)

(56) References Cited

U.S. PATENT DOCUMENTS

2015/0356401 A1* 12/2015 Vinyals .................... G06N 3/02 706/15
2016/0232440 A1* 8/2016 Gregor ................. G06N 3/0445

OTHER PUBLICATIONS

Arik et al., "Deep voice: Real-time neural text-to-speech." Proceedings of the 34th International Conference on Machine Learning—vol. 70. JMLR. org, (Year: 2017).*
Yang, Shan, et al. "Enhancing Hybrid Self-attention Structure with Relative-position-aware Bias for Speech Synthesis." ICASSP 2019-2019 IEEE International Conference on Acoustics, Speech and Signal Processing (ICASSP). IEEE (Year: 2019).*
Oord et al., "Wavenet: A generative model for raw audio." arXiv preprint arXiv:1609.03499 (Year: 2016).*
Ioffe et al, "Batch normalization: Accelerating deep network training by reducing internal covariate shift," arXiv, Mar. 2, 2015, 11 pages.
Oord et al, "Wavenet: A Generative Model for Raw Audio," arXiv, Sep. 12, 2016, 15 pages.
PCT International Search Report and Written Opinion in International Appln. PCT/US2018/025101, dated Oct. 2, 2018, 21 pages.
Sotelo et al, "Workshop Track—ICLR 2017 Char2Wav: End-to-End Speech Synthesis," Semantics Scholar, 6 pages.
Abadi et al, "TensorFlow: Large-scale machine learning on heterogeneous distributed systems," arXiv, Mar. 16, 2016, 19 pages.
Arik et al, "Deep voice: Real-time neural text-to-speech," arXiv, Mar. 7, 2017, 17 pages.
Bandanau et al, "Neural machine translation by jointly learning to align and translate," arXiv, May 19, 2016, 15 pages.
Bengio et al, "Scheduled sampling for sequence prediction with recurrent neural networks," arXiv, Sep. 23, 2015, 9 pages.
Chan et al, "Listen, attend and spell: A neural network for large vocabulary converstaional speech recognition," IEEE Xplore, Aug. 20, 2015, 16 pages.
Chung et al, "Empirical evaluation of gated recurrent neural networks on sequence modeling," arXiv, Dec. 11, 2014, 9 pages.
Gonzalvo et al, "Recent advances in google real-time hmm-driven unit selection synthesizer," Interspeech, Sep. 2016, 5 pages.
Griffin et al, "Signal estimation from modified short-time fourier transform," IEEE Xplore, Apr. 1984, 8 pages.
He et al, "Deep residual learning for image recognition," arXiv, Dec. 10, 2015, 12 pages.
Kingma et al, "Adam: A method for stochastic optimization," arXiv, Jan. 30, 2017, 15 pages.
Lee et al, "Fully character-level neural machine translation without explicit segmentation," arXiv, Jun. 13, 2017, 13 pages.
Mehri et al, "SampleRNN: An unconditional end-to-end neural audio generation model," arXiv, Feb. 11, 2017, 11 pages.
Sproat et al, "RNN approaches to text normalization. A challenge," arXiv, Jan. 24, 2017, 17 pages.
Srivastava et al, "Highway networks," arXiv, Nov. 3, 2015, 6 pages.
Sutskever et al, "Sequence to sequence learning with neural networks," arXiv, Dec. 14, 2014, 9 pages.
Vinyals et al, "Grammer as a foreign language," arXiv, Jun. 9, 2015, 10 pages.
Wang et al, "First step towards end-to-tend parametrics TTS synthesis: Generating spectral parameters with neural attention," Semantic Scholar, Sep. 2016, 5 pages.
Wu et al, "Google's neural machine translation system: Bridging the gap between human and machine translation," arXiv, Oct. 8, 2016, 23 pages.
Zen et al, "Fast, compact, and high quality LSTM-RNN based statistical parametric speech synthesizers for mobile devices," arXiv, Jun. 22, 2016, 14 pages.
Zen et al, "Statistical parametric speech synthesis," Cambridge Research Laboratory, Apr. 2009, 23 pages.
PCT International Preliminary Report on Patentability in International Appln. No. PCT/US2018/025101, dated Aug. 30, 2019, 7 pages.

* cited by examiner

END-TO-END TEXT-TO-SPEECH CONVERSION

CROSS REFERENCE TO RELATED APPLICATIONS

This application claims the benefit of International Application No. PCT/US2018/025101, filed on Mar. 29, 2018, which claims priority to Greek Patent Application No. 20170100126, filed on Mar. 29, 2017, the entire contents of which are hereby incorporated by reference.

BACKGROUND

This specification relates to converting text to speech using neural networks.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. An example of a recurrent neural network is a long short term (LSTM) neural network that includes one or more LSTM memory blocks. Each LSTM memory block can include one or more cells that each include an input gate, a forget gate, and an output gate that allow the cell to store previous states for the cell, e.g., for use in generating a current activation or to be provided to other components of the LSTM neural network.

SUMMARY

This specification describes a system implemented as computer programs on one or more computers in one or more locations that converts text to speech.

In general, one innovative aspect may be embodied in a system that includes one or more computers and one or more storage devices storing instructions that when executed by one or more computers cause the one or more computers to implement: a sequence-to-sequence recurrent neural network configured to: receive a sequence of characters in a particular natural language, and process the sequence of characters to generate a spectrogram of a verbal utterance of the sequence of characters in the particular natural language; and a subsystem configured to: receive the sequence of characters in the particular natural language, and provide the sequence of characters as input to the sequence-to-sequence recurrent neural network to obtain as output the spectrogram of the verbal utterance of the sequence of characters in the particular natural language. The subsystem can be further configured to generate speech using the spectrogram of the verbal utterance of the input sequence of characters in the particular natural language; and provide the generated speech for playback.

The subject matter described in this specification can be implemented in particular embodiments so as to realize one or more of the following advantages. By generating speech at the frame level, the system described in this specification can generate speech from text faster than other systems while generating speech that is of comparable or even better quality. In addition, as will be explained in more detail below, the system described herein can reduce model size, training time, and inference time and can also substantially increase convergence speed. The system described in this specification can generate high-quality speech without requiring hand-engineered linguistic features or complex components, e.g., without requiring a Hidden Markov Model (HMM) aligner, resulting in reduced complexity and using fewer computational resources while still generating high quality speech.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
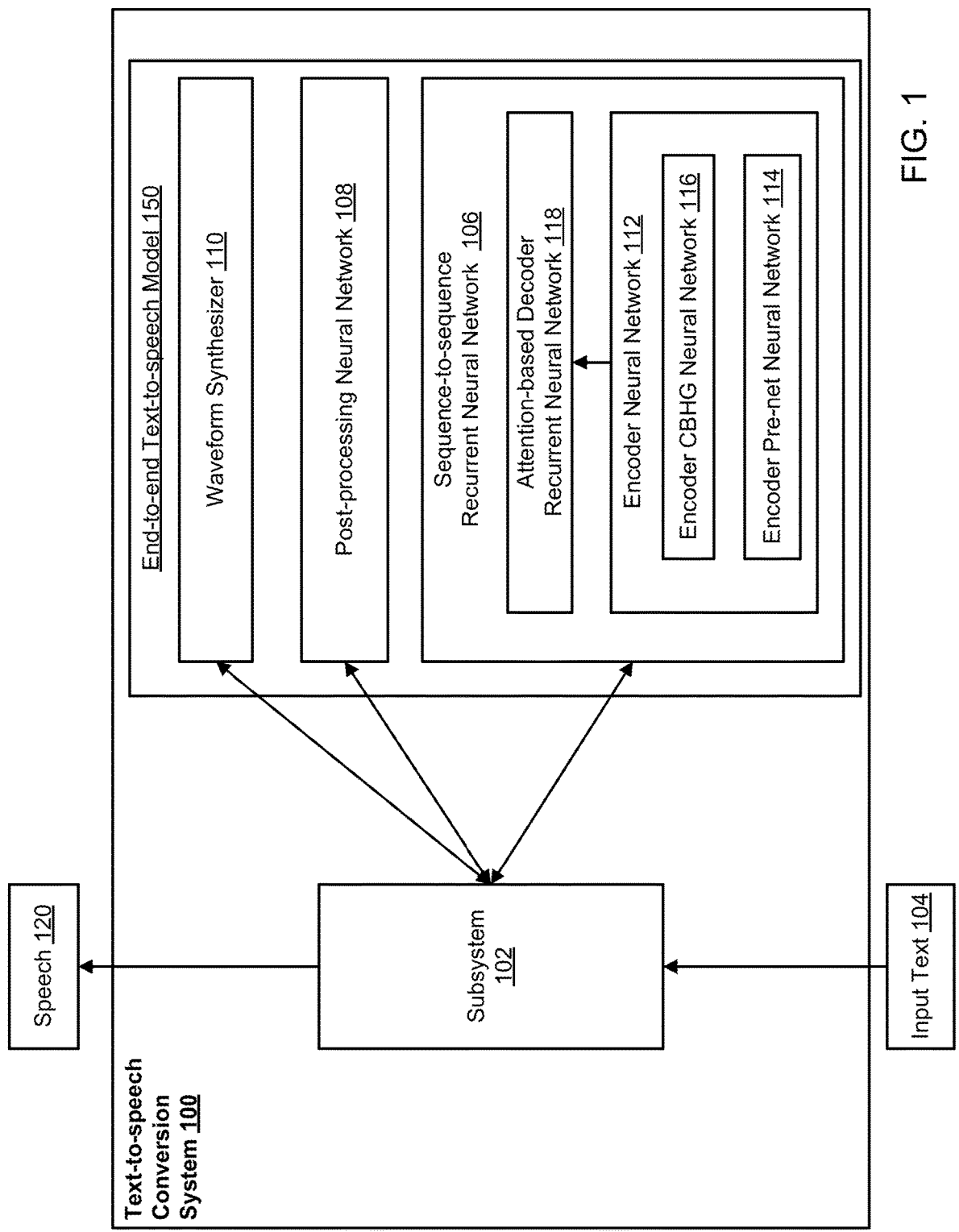
FIG. 1 shows an example text-to-speech conversion system.

FIG. 1 shows an example text-to-speech conversion system 100. The text-to-speech conversion system 100 is an example of a system implemented as computer programs on one or more computers in one or more locations, in which the systems, components, and techniques described below can be implemented.

The system 100 includes a subsystem 102 that is configured to receive input text 104 as an input and to process the input text 104 to generate speech 120 as an output. The input text 104 includes a sequence of characters in a particular natural language. The sequence of characters may include alphabet letters, numbers, punctuation marks, and/or other special characters. The input text 104 can be a sequence of characters of varying lengths.

To process the input text 104, the subsystem 102 is configured to interact with an end-to-end text-to-speech model 150 that includes a sequence-to-sequence recurrent neural network 106 (hereafter "seq2seq network 106"), a post-processing neural network 108, and a waveform synthesizer 110.

After the subsystem 102 receives input text 104 that includes a sequence of characters in a particular natural language, the subsystem 102 provides the sequence of characters as input to the seq2seq network 106. The seq2seq network 106 is configured to receive the sequence of characters from the subsystem 102 and to process the sequence of characters to generate a spectrogram of a verbal utterance of the sequence of characters in the particular natural language.

In particular, the seq2seq network 106 processes the sequence of characters using (i) an encoder neural network 112, which includes an encoder pre-net neural network 114 and an encoder CBHG neural network 116, and (ii) an attention-based decoder recurrent neural network 118. Each character in the sequence of characters can be represented as a one-hot vector and embedded into a continuous vector. That is, the subsystem 102 can represent each character in the sequence as a one-hot vector and then generate an embedding, i.e., a vector or other ordered collection of numeric values, of the character before providing the sequence as input to the seq2seq network 106.

The encoder pre-net neural network 114 is configured to receive a respective embedding of each character in the sequence and process the respective embedding of each character to generate a transformed embedding of the character. For example, the encoder pre-net neural network 114 can apply a set of non-linear transformations to each embedding to generate a transformed embedding. In some cases, the encoder pre-net neural network 114 includes a bottleneck neural network layer with dropout to increase convergence speed and improve generalization capability of the system during training.

The encoder CBHG neural network 116 is configured to receive the transformed embeddings from the encoder pre-net neural network 206 and process the transformed embeddings to generate encoded representations of the sequence of characters. The encoder CBHG neural network 112 includes a CBHG neural network, which is described in more detail below with respect to FIG. 2. The use of the encoder CBHG neural network 112 as described herein may reduce overfitting. In addition, it may result in fewer mispronunciations when compared to, for instance, a multi-layer RNN encoder.

The attention-based decoder recurrent neural network 118 (herein referred to as "the decoder neural network 118") is configured to receive a sequence of decoder inputs. For each decoder input in the sequence, the decoder neural network 118 is configured to process the decoder input and the encoded representations generated by the encoder CBHG neural network 116 to generate multiple frames of the spectrogram of the sequence of characters. That is, instead of generating (predicting) one frame at each decoder step, the decoder neural network 118 generates r frames of the spectrogram, with r being an integer greater than one. In many cases, there is no overlap between sets of r frames.

In particular, at decoder step t, at least the last frame of the r frames generated at decoder step t−1 is fed as input to the decoder neural network 118 at decoder step t+1. In some implementations, all of the r frames generated at the decoder step t−1 can be fed as input to the decoder neural network 118 at the decoder step t+1. The decoder input for the first decoder step can be an all-zero frame (i.e. a <GO> frame). Attention over the encoded representations is applied to all decoder steps, e.g., using a conventional attention mechanism. The decoder neural network 118 may use a fully connected neural network layer with a linear activation to simultaneously predict r frames at a given decoder step. For example, to predict 5 frames, each frame being an 80-D (80-Dimension) vector, the decoder neural network 118 uses the fully connected neural network layer with the linear activation to predict a 400-D vector and to reshape the 400-D vector to obtain the 5 frames.

By generating r frames at each time step, the decoder neural network 118 divides the total number of decoder steps by r, thus reducing model size, training time, and inference time. Additionally, this technique substantially increases convergence speed, i.e., because it results in a much faster (and more stable) alignment between frames and encoded representations as learned by the attention mechanism. This is because neighboring speech frames are correlated and each character usually corresponds to multiple frames. Emitting multiple frames at a time step allows the decoder neural network 118 to leverage this quality to quickly learn how to, i.e., be trained to, efficiently attend to the encoded representations during training.

The decoder neural network 118 may include one or more gated recurrent unit neural network layers. To speed up convergence, the decoder neural network 118 may include one or more vertical residual connections. In some implementations, the spectrogram is a compressed spectrogram such as a mel-scale spectrogram. Using a compressed spectrogram instead of, for instance, a raw spectrogram may reduce redundancy, thereby reducing the computation required during training and inference.

The post-processing neural network 108 is configured to receive the compressed spectrogram and process the compressed spectrogram to generate a waveform synthesizer input.

To process the compressed spectrogram, the post-processing neural network 108 includes a CBHG neural network. In particular, the CBHG neural network includes a 1-D convolutional subnetwork, followed by a highway network, and followed by a bidirectional recurrent neural network. The CBHG neural network may include one or more residual connections. The 1-D convolutional subnetwork may include a bank of 1-D convolutional filters followed by a max pooling along time layer with stride one. In some cases, the bidirectional recurrent neural network is a gated recurrent unit neural network. The CBHG neural network is described in more detail below with reference to FIG. 2.

In some implementations, the post-processing neural network 108 has been trained jointly with the sequence-to-sequence recurrent neural network 106. That is, during training, the system 100 (or an external system) trains the post-processing neural network 108 and the seq2seq network 106 on the same training dataset using the same neural network training technique, e.g., a gradient descent-based training technique. More specifically, the system 100 (or an external system) can backpropagate an estimate of a gradient of a loss function to jointly adjust the current values of all network parameters of the post-processing neural network 108 and the seq2seq network 106. Unlike conventional systems that have components that need to be separately trained or pre-trained and thus each component's errors can compound, systems that have the post-processing NN 108 and seq2seq network 106 that are jointly trained are more robust (e.g., they have smaller errors and can be trained from scratch). These advantages enable the training of the end-to-end text-to-speech model 150 on a very large amount of rich, expressive yet often noisy data found in the real world.

The waveform synthesizer 110 is configured to receive the waveform synthesizer input, and process the waveform synthesizer input to generate a waveform of the verbal utterance of the input sequence of characters in the particular natural language. In some implementations, the waveform synthesizer is a Griffin-Lim synthesizer. In some other implementations, the waveform synthesizer is a vocoder. In some other implementations, the waveform synthesizer is a trainable spectrogram to waveform inverter.

After the waveform synthesizer 110 generates the waveform, the subsystem 102 can generate speech 120 using the waveform and provide the generated speech 120 for playback, e.g., on a user device, or provide the generated waveform to another system to allow the other system to generate and play back the speech.

Figure 2:
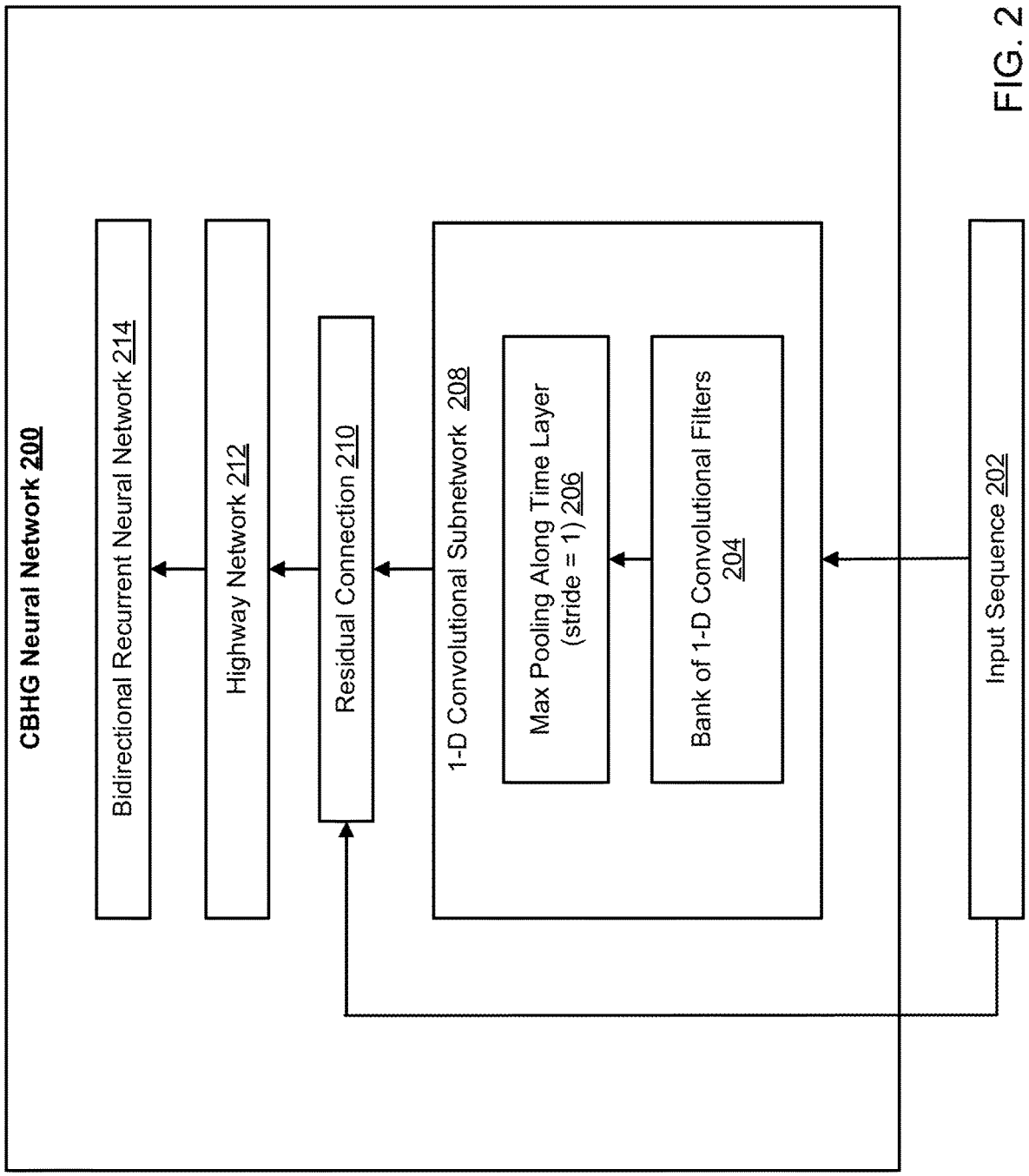
FIG. 2 shows an example CBHG neural network.

FIG. 2 shows an example CBHG neural network 200. The CBHG neural network 200 can be the CBHG neural network included in the encoder CBHG neural network 116 or the CBHG neural network included in the post-processing neural network 108 of FIG. 1.

The CBHG neural network 200 includes a 1-D convolutional subnetwork 208, followed by a highway network 212, and followed by a bidirectional recurrent neural network 214. The CBHG neural network 200 may include one or more residual connections, e.g., the residual connection 210.

The 1-D convolutional subnetwork 208 may include a bank of 1-D convolutional filters 204 followed by a max pooling along time layer with a stride of one 206. The bank of 1-D convolutional filters 204 may include K sets of 1-D convolutional filters, in which the k-th set includes $C_k$ filters each having a convolution width of k.

The 1-D convolutional subnetwork 208 is configured to receive an input sequence 202, for example, transformed embeddings of a sequence of characters that are generated by an encoder pre-net neural network. The subnetwork 208 processes the input sequence using the bank of 1-D convolutional filters 204 to generate convolution outputs of the input sequence 202. The subnetwork 208 then stacks the convolution outputs together and processes the stacked convolution outputs using the max pooling along time layer with stride one 206 to generate max-pooled outputs. The subnetwork 208 then processes the max-pooled outputs using one or more fixed-width 1-D convolutional filters to generate subnetwork outputs of the subnetwork 208.

After the subnetwork outputs are generated, the residual connection 210 is configured to combine the subnetwork outputs with the original input sequence 202 to generate convolution outputs.

The highway network 212 and the bidirectional recurrent neural network 214 are then configured to process the convolution outputs to generate encoded representations of the sequence of characters.

In particular, the highway network 212 is configured to process the convolution outputs to generate high-level feature representations of the sequence of characters. In some implementations, the highway network includes one or more fully-connected neural network layers.

The bidirectional recurrent neural network 214 is configured to process the high-level feature representations to generate sequential feature representations of the sequence of characters. A sequential feature representation represents a local structure of the sequence of characters around a particular character. A sequential feature representation may include a sequence of feature vectors. In some implementations, the bidirectional recurrent neural network is a gated recurrent unit neural network.

During training, one or more of the convolutional filters of the 1-D convolutional subnetwork 208 can be trained using batch normalization method, which is described in detail in S. Ioffe and C. Szegedy, "Batch normalization: Accelerating deep network training by reducing internal covariate shift," arXiv preprint arXiv:1502.03167, 2015.

In some implementations, one or more convolutional filters in the CBHG neural network 200 are non-causal convolutional filters, i.e., convolutional filters that, at a given time step T, can convolve with surrounding inputs in both directions (e.g., . . . , T−1, T−2 and T+1, T+2, . . . etc.). In contrast, a causal convolutional filter can only convolve with previous inputs ( . . . T−1, T−2, etc.).

In some other implementations, all convolutional filters in the CBHG neural network 200 are non-causal convolutional filters.

The use of non-causal convolutional filters, batch normalization, residual connections, and max pooling along time layer with stride one improves the generalization capability of the CBHG neural network 200 on the input sequence and thus enables the text-to-speech conversion system to generate high-quality speech.

Figure 3:
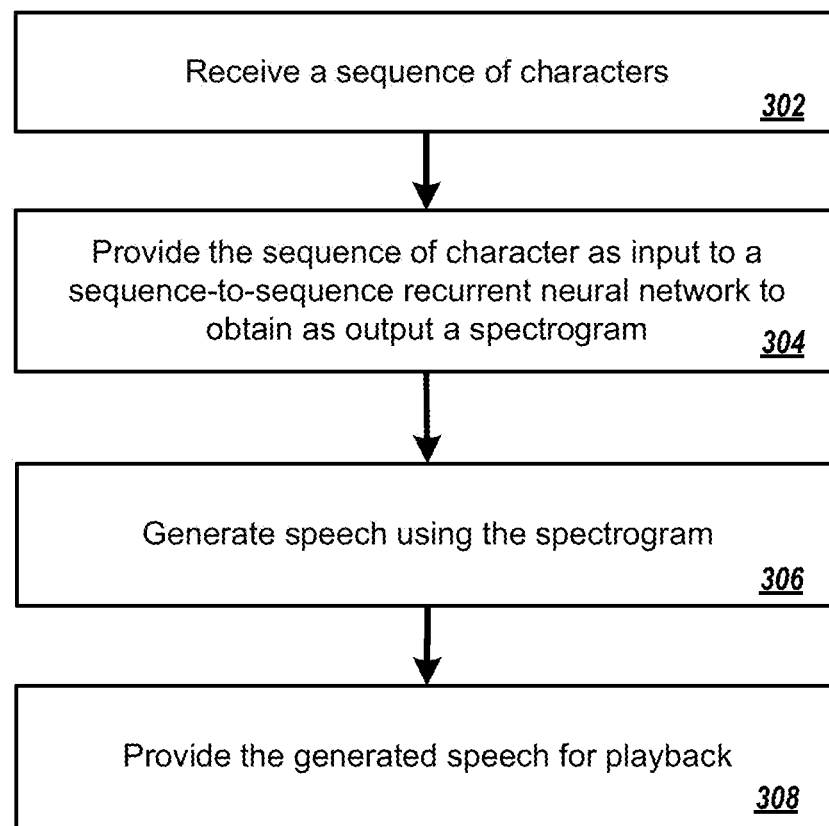
FIG. 3 is a flow diagram of an example process for converting a sequence of characters to speech.

FIG. 3 is a flow diagram of an example process 300 for converting a sequence of characters to speech. For convenience, the process 300 will be described as being performed by a system of one or more computers located in one or more locations. For example, a text-to-speech conversion system (e.g., the text-to-speech conversion system 100 of FIG. 1) or a subsystem of a text-to-speech conversion system (e.g., the subsystem 102 of FIG. 1), appropriately programmed, can perform the process 300.

The system receives a sequence of characters in a particular natural language (step 302).

The system then provides the sequence of character as input to a sequence-to-sequence (seq2seq) recurrent neural network to obtain as output a spectrogram of a verbal utterance of the sequence of characters in the particular natural language (step 304). In some implementations, the spectrogram is a compressed spectrogram, e.g., a mel-scale spectrogram.

In particular, after receiving the sequence of characters from the system, the seq2seq recurrent neural network processes the sequence of characters to generate a respective encoded representation of each of the characters in the sequence using an encoder neural network including an encoder pre-net neural network and an encoder CBHG neural network.

More specifically, each character in the sequence of characters can be represented as a one-hot vector and embedded into a continuous vector. The encoder pre-net neural network receives a respective embedding of each character in the sequence and processes the respective embedding of each character in the sequence to generate a transformed embedding of the character using an encoder pre-net neural network. For example, the encoder pre-net neural network can apply a set of non-linear transformations to each embedding to generate a transformed embedding. The encoder CBHG neural network then receives the transformed embeddings from the encoder pre-net neural network and processes the transformed embeddings to generate the encoded representations of the sequence of characters.

To generate a spectrogram of a verbal utterance of the sequence of characters, the seq2seq recurrent neural network processes the encoded representations using an attention-based decoder recurrent neural network. In particular, the attention-based decoder recurrent neural network receives a sequence of decoder inputs. The first decoder input in the sequence is a predetermined initial frame. For each decoder input in the sequence, the attention-based decoder recurrent neural network processes the decoder input and the encoded representations to generate r frames of the spectrogram, in which r is an integer greater than one. One or more of the generated r frames can be used as the next decoder input in the sequence. In other words, each other decoder input in the sequence is one or more of the r frames generated by processing a decoder input that precedes the decoder input in the sequence.

The output of the attention-based decoder recurrent neural network thus includes multiple sets of frames that form the spectrogram, in which each set includes r frames. In many cases, there is no overlap between sets of r frames. By generating r frames at a time, the total number of decoder steps performed by the attention-based decoder recurrent neural network is reduced by a factor of r, thus reducing training and inference time. This technique also helps to increase convergence speed and learning rate of the attention-based decoder recurrent neural network and the system in general.

The system generates speech using the spectrogram of the verbal utterance of the sequence of characters in the particular natural language (step 306).

In some implementations, when the spectrogram is a compressed spectrogram, the system can generate a waveform from the compressed spectrogram and generate speech using the waveform. Generating speech from a compressed spectrogram is described in more detailed below with reference to FIG. 4.

The system then provides the generated speech for playback (step 308). For example, the system transmits the generated speech to a user device over a data communication network for playback.

Figure 4:
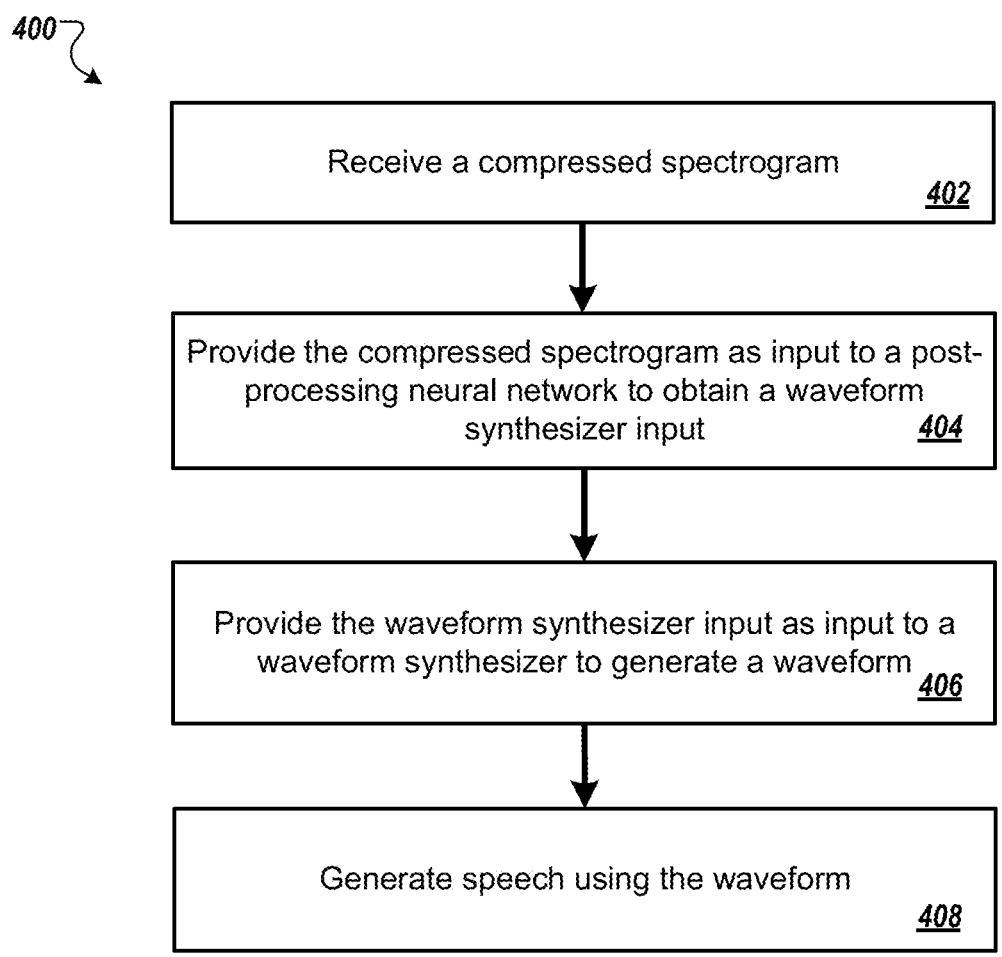
FIG. 4 is a flow diagram of an example process for generating speech from a compressed spectrogram of a verbal utterance of the sequence of characters.

FIG. 4 is a flow diagram of an example process 400 for generating speech from a compressed spectrogram of a verbal utterance of the sequence of characters. For convenience, the process 400 will be described as being performed by a system of one or more computers located in one or more locations. For example, a text-to-speech conversion system (e.g., the text-to-speech conversion system 100 of FIG. 1) or a subsystem of a text-to-speech conversion system (e.g., the subsystem 102 of FIG. 1), appropriately programmed, can perform the process 400.

The system receives a compressed spectrogram of a verbal utterance of a sequence of characters in a particular natural language (step 402).

The system then provides the compressed spectrogram as input to a post-processing neural network to obtain a waveform synthesizer input (step 404). In some cases, the waveform synthesizer input is a linear-scale spectrogram of the verbal utterance of the input sequence of characters in the particular natural language.

After obtaining the waveform synthesizer input, the system provides the waveform synthesizer input as input to a waveform synthesizer (step 406). The waveform synthesizer processes the waveform synthesizer input to generate a waveform. In some implementations, the waveform synthesizer is a Griffin-Lim synthesizer that uses Griffin-Lim algorithm to synthesize the waveform from the waveform synthesizer input such as a linear-scale spectrogram. In some other implementations, the waveform synthesizer is a vocoder. In some other implementations, the waveform synthesizer is a trainable spectrogram to waveform inverter.

The system then generates speech using the waveform, i.e., generates the sounds that are represented by the waveform (step 408). The system may then provide the generated speech for playback, e.g., on a user device. In some implementations, the system may provide the waveform to another system to allow the other system to generate and play back the speech.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows can be performed by and apparatus can also be implemented as a graphics processing unit (GPU).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

The invention claimed is:

1. A system comprising one or more computers and one or more non-transitory storage devices storing instructions that, when executed by one or more computers, cause the one or more computers to implement:
   a sequence-to-sequence recurrent neural network configured to:
      receive a sequence of characters in a particular natural language, and
      process the sequence of characters to generate a spectrogram of a verbal utterance of the sequence of characters in the particular natural language; and
   a subsystem configured to:
      receive the sequence of characters in the particular natural language, and
      provide the sequence of characters as input to the sequence-to-sequence recurrent neural network to obtain as output the spectrogram of the verbal utterance of the sequence of characters in the particular natural language, wherein the sequence-to-sequence recurrent neural network comprises:
      an encoder neural network configured to:

receive the sequence of characters, and
process the sequence of characters to generate a respective encoded representation of each of the characters in the sequence; and
an attention-based decoder recurrent neural network configured to:
receive a sequence of decoder inputs; and
for each decoder input in the sequence:
process the decoder input and the encoded representations to generate r frames of the spectrogram, wherein r is an integer greater than one, wherein each of the second and subsequent decoder inputs in the sequence is one or more of the r frames of the spectrogram that were generated by processing the preceding decoder input in the sequence,
wherein the subsystem is further configured to generate a waveform from the spectrogram of the verbal utterance of the sequence of characters in the particular natural language.

2. The system of claim 1, wherein the encoder neural network comprises:
an encoder pre-net neural network configured to:
receive a respective embedding of each character in the sequence, and
process the respective embedding of each character in the sequence to generate a transformed embedding of the character, and
an encoder CBHG neural network configured to:
receive the transformed embeddings, and
process the transformed embeddings to generate the encoded representations.

3. The system of claim 2, wherein the encoder CBHG neural network comprises a bank of 1-D convolutional filters, followed by a highway network, and followed by a bidirectional recurrent neural network.

4. The system of claim 3, wherein the bidirectional recurrent neural network is a gated recurrent unit neural network.

5. The system of claim 3, wherein the encoder CBHG includes a residual connection between the transformed embeddings and outputs of the bank of 1-D convolutional filters.

6. The system of claim 3, wherein the bank of 1-D convolutional filters includes a max pooling along time layer with stride one.

7. The system of claim 1, wherein a first decoder input in the sequence is a predetermined initial frame.

8. The system of claim 1, wherein the spectrogram is a compressed spectrogram.

9. The system of claim 8, wherein the compressed spectrogram is a mel-scale spectrogram.

10. The system of claim 8, wherein the system further comprises:
a post-processing neural network configured to:
receive the compressed spectrogram, and
process the compressed spectrogram to generate a waveform synthesizer input; and
a waveform synthesizer configured to:
receive the waveform synthesizer input, and
process the waveform synthesizer input to generate the waveform of the verbal utterance of the input sequence of characters in the particular natural language; and
wherein the subsystem is further configured to:
provide the compressed spectrogram as input to the post-processing neural network to obtain the waveform synthesizer input; and
provide the waveform synthesizer input as input to the waveform synthesizer to generate the waveform.

11. The system of claim 1, wherein the subsystem is further configured to:
generate speech using the waveform, and
provide the generated speech for playback.

12. The system of claim 10, wherein the waveform synthesizer input is a linear-scale spectrogram of the verbal utterance of the input sequence of characters in the particular natural language.

13. The system of claim 10, wherein the waveform synthesizer is a trainable spectrogram to waveform inverter.

14. The system of claim 10, wherein the post-processing neural network has been trained jointly with the sequence-to-sequence recurrent neural network.

15. The system of claim 10, wherein the post-processing neural network is a CBHG neural network that comprises a 1-D convolutional subnetwork, followed by a highway network, and followed by a bidirectional recurrent neural network.

16. The system of claim 15, wherein the bidirectional recurrent neural network is a gated recurrent unit neural network.

17. The system of claim 15, wherein the CBHG neural network includes one or more residual connections.

18. The system of claim 15, wherein the 1-D convolutional subnetwork comprises a bank of 1-D convolutional filters followed by a max pooling along time layer with stride one.

19. The system of claim 1, wherein the subsystem is further configured to:
generate speech using the spectrogram of the verbal utterance of the input sequence of characters in the particular natural language; and
provide the generated speech for playback.

20. One or more non-transitory computer storage media storing instructions that, when executed by one or more computers, cause the one or more computers to implement:
a sequence-to-sequence recurrent neural network configured to:
receive a sequence of characters in a particular natural language, and
process the sequence of characters to generate a spectrogram of a verbal utterance of the sequence of characters in the particular natural language; and
a subsystem configured to:
receive the sequence of characters in the particular natural language, and
provide the sequence of characters as input to the sequence-to-sequence recurrent neural network to obtain as output the spectrogram of the verbal utterance of the sequence of characters in the particular natural language, wherein the sequence-to-sequence recurrent neural network comprises:
an encoder neural network configured to:
receive the sequence of characters, and
process the sequence of characters to generate a respective encoded representation of each of the characters in the sequence; and
an attention-based decoder recurrent neural network configured to:
receive a sequence of decoder inputs; and
for each decoder input in the sequence:
process the decoder input and the encoded representations to generate r frames of the spectrogram, wherein r is an integer greater than one, wherein each of the second and subsequent decoder inputs in the sequence is one or more of the r frames of the spectrogram that were generated by processing the preceding decoder input in the sequence, wherein the subsystem is further configured to generate a waveform from the spectrogram of the verbal utterance of the sequence of characters in the particular natural language.

\* \* \* \* \*